United States Patent
Wurman et al.

(10) Patent No.: US 6,456,229 B2
(45) Date of Patent: Sep. 24, 2002

(54) BISTATIC RADAR NETWORK HAVING INCOHERENT TRANSMITTER OPERATING IN A SCANNING MODE TO IDENTIFY SCATTERERS

(75) Inventors: Joshua Michael Wurman; Mitchell Alfred Randall; Chris Dale Burghart, all of Boulder, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 0 days.

(21) Appl. No.: 09/813,232

(22) Filed: Mar. 20, 2001

Related U.S. Application Data

(63) Continuation-in-part of application No. 09/460,039, filed on Dec. 13, 1999, now Pat. No. 6,377,204.

(51) Int. Cl.[7] .......................... G01S 13/00; G01S 13/95
(52) U.S. Cl. .............................. 342/59; 342/26; 342/74; 342/75; 342/81; 342/147; 342/158; 342/195
(58) Field of Search .......................... 342/26, 59, 104, 342/118, 128, 129, 130–144, 158, 192–197, 27, 28, 74, 75–81, 115, 120, 121–127, 147–157, 175, 189, 190, 191; 702/1, 2, 3

(56) References Cited

U.S. PATENT DOCUMENTS

| | | | | |
|---|---|---|---|---|
| 4,613,938 A | * | 9/1986 | Hansen et al. | 702/3 |
| 5,410,314 A | * | 4/1995 | Frush et al. | 342/26 |
| 5,434,570 A | * | 7/1995 | Wurman | 342/26 |
| 5,469,169 A | * | 11/1995 | Frush | 342/26 |
| 5,534,868 A | * | 7/1996 | Gjessing et al. | 342/26 |
| 5,623,267 A | * | 4/1997 | Wurman | 342/26 |
| 6,137,433 A | * | 10/2000 | Zavorotny et al. | 342/26 |

* cited by examiner

Primary Examiner—Bernarr E. Gregory

(57) ABSTRACT

The bistatic radar network uses an incoherent transmitter for determining the presence, locus, motion, and characteristics of scatterers in a predefined space. The incoherent transmitter generates pulses of high frequency energy that vary in frequency and/or phase. The bistatic radar network having an incoherent transmitter uses a scanning beam antenna located at the transmitter to transmit a focused beam of high frequency energy into a predefined space, with the transmitted beam comprising a series of pulses, each pulse in the series of pulses having a varying frequency, phase, pulse origination time and direction of propagation as it is emanated from said antenna. The transmitter also includes apparatus for determining pulse origination data comprising: frequency, phase, pulse origination time and direction of propagation, for each of the pulses in the transmitted beam emanating from the antenna, where the antenna is scanned in a predetermined scan pattern in at least an azimuthal direction. The bistatic network also includes at least one receiver, located at a site remote from the transmitter and includes apparatus for generating pulse component receipt data indicative of receipt of components of the pulses that are contained in the transmitted beam that are reflected from scatterers in the predefined space, and a processor, responsive to receipt of the pulse origination data from the transmitter and the pulse component receipt data, for generating scatterer location data indicative of presence, locus, motion, and characteristics of scatterers in the predefined space.

32 Claims, 3 Drawing Sheets

BISTATIC RADAR NETWORK HAVING INCOHERENT TRANSMITTER OPERATING IN A SCANNING MODE TO IDENTIFY SCATTERERS

CROSS-REFERENCE TO RELATED APPLICATIONS

This application is a continuation-in-part of U.S. patent application Ser. No.: 09/460,039, filed Dec. 13, 1999, now U.S. Pat. No. 6,377,204, and titled "Radar System Having Multiple Simultaneously Transmitted Beams Operating in a Scanning Mode to Identify Scatterers," and is related to U.S. patent application Ser. No. 09/872,771, filed Mar. 20, 2002, titled "Bistatic Radar System for Centralized, Near-Real-Time Synchronized, Processing of Data to Identify Scatterers."

FIELD OF THE INVENTION

This invention relates to radar systems that transmit a beam of high frequency energy in a scanning mode to identify the presence, locus, motion, and characteristics of scatters in a region of space.

Problem

It is a problem in the field of radar systems, and weather radar systems in particular, to implement an inexpensive system that collects sufficient data to provide accurate information to the users relating to the presence, locus and characteristics of scatters in a region of space, in a short period of time. Radar systems can be characterized in terms of the basic system architecture as either monostatic radar systems which use a single transmitter and receiver or bistatic radar network systems which use a single radar transmitter and a plurality of receivers, at least one of which is located remotely from the transmitter site.

Included in the field of monostatic radar systems are the standard narrow beam radar systems which transmit a single narrow beam of high frequency radiation, then receive signals, which constitute components of this narrow beam that have been reflected off scatterers located in the path of the beam. These systems usually include a mechanically driven antenna to execute a predetermined scan pattern that covers a predetermined volume of space. The scanning speed is limited by the ability to obtain independent meteorological samples using a single frequency and by the ability to mechanically move a large antenna, thereby preventing these systems from both scanning extremely rapidly and frequently revisiting particular regions of space. To increase the accuracy of the data produced by the narrow beam radar systems, expensive rotating high gain antennas are used. As a result, the cost of implementing, operating, and maintaining such systems is high. Furthermore, the accuracy of the data produced is adversely affected by the infrequent scan pattern of the rotating antenna. These narrow beam radar systems, when used as a weather radar, collect data that is indicative of only the radial component of the wind field present in the predetermined volume of space.

Included in the field of monostatic radar systems are the broad beam radar systems which transmit a single broad beam of high frequency radiation. These systems receive a plurality of signals, comprising the radiation that is reflected off a plurality of scatters located in the broad beam of the transmitted beam, using a receiving antenna or antennas that is/are sensitive to radiation from particular directions more than others. These broad beam radar systems can include a mechanically driven antenna to execute a predetermined scan pattern that covers a predetermined volume of space. The sensitivity of these systems is low due to the broad beam transmission. These systems are also adversely affected by the fact that radiation is received from outside the narrowly defined directions defined by the receiving antennas. These broad beam radar systems, when used as a weather radar, also collect data that is indicative of only the radial component of the wind field present in the predetermined volume of space.

An alternative to monostatic radar systems are the bistatic radar networks which use a single radar transmitter and a plurality of passive, low-gain receivers, at least one of which is located remotely from the transmitter site, such as is disclosed in U.S. Pat. No. 5,410,314, U.S. Pat. No. 5,469,169, U.S. Pat. No. 5,471,211. In such a network, the transmitter produces a "pencil beam" of high frequency energy, which is reflected off scatterers as the rotating antenna scans the predetermined volume of space. The reflected radial component of the beam is received by a receiver located at the transmitter site, while other components of the reflected beam are received at other receivers located remote from the transmitter site. The bistatic radar network has the advantage of receiving back scattered reflections indicative of the radial component of the scatterer motion as well as other components, which enable the network to simply produce a three-dimensional determination of the characteristics of the scatterers. This radar network is relatively inexpensive due to the use of the plurality of passive, low-gain receivers, but does require the use of a transmitter that is closely synchronized with the plurality of remotely located receivers to enable the receivers to track the transmitted pulses by working from the same time base and scan pattern as the transmitter. The synchronization can be accomplished on a less than pulse basis, if the transmitter frequency, pulse rate and scan pattern are all known and immutable. However, any irregularities in these criteria result in the receivers being incapable of computing the location of the scatterers, since the origin of the pulses are not known.

Solution

The above described problems are solved and a technical advance is achieved by the present bistatic radar network having an incoherent transmitter for determining the presence, locus, motion, and characteristics of scatterers in a predefined space. The incoherent transmitter generates pulses of high frequency energy that vary in frequency and/or phase. The bistatic radar network having an incoherent transmitter uses a scanning beam antenna located at the transmitter to transmit a focused beam of high frequency energy into a predefined space, with the transmitted beam comprising a series of pulses, each pulse in the series of pulses having a varying frequency, phase, pulse origination time and direction of propagation as it is emanated from the antenna. The transmitter also includes apparatus for determining pulse origination data comprising: frequency, phase, pulse origination time and direction of propagation, for each of the pulses in the transmitted beam emanating from the antenna, where the antenna is scanned in a predetermined scan pattern in at least an azimuthal direction. The bistatic network also includes at least one receiver, located at a site remote from the transmitter and includes apparatus for generating pulse component receipt data indicative of receipt of components of the pulses that are contained in the transmitted beam that are reflected from scatterers in the predefined space, and a processor, responsive to receipt of the pulse origination data from the transmitter and the pulse component receipt data, for generating scatterer location data indicative of presence, locus, motion, and characteristics of scatterers in the predefined space.

BRIEF DESCRIPTION OF THE INVENTION

DETAILED DESCRIPTION

Figure 1:
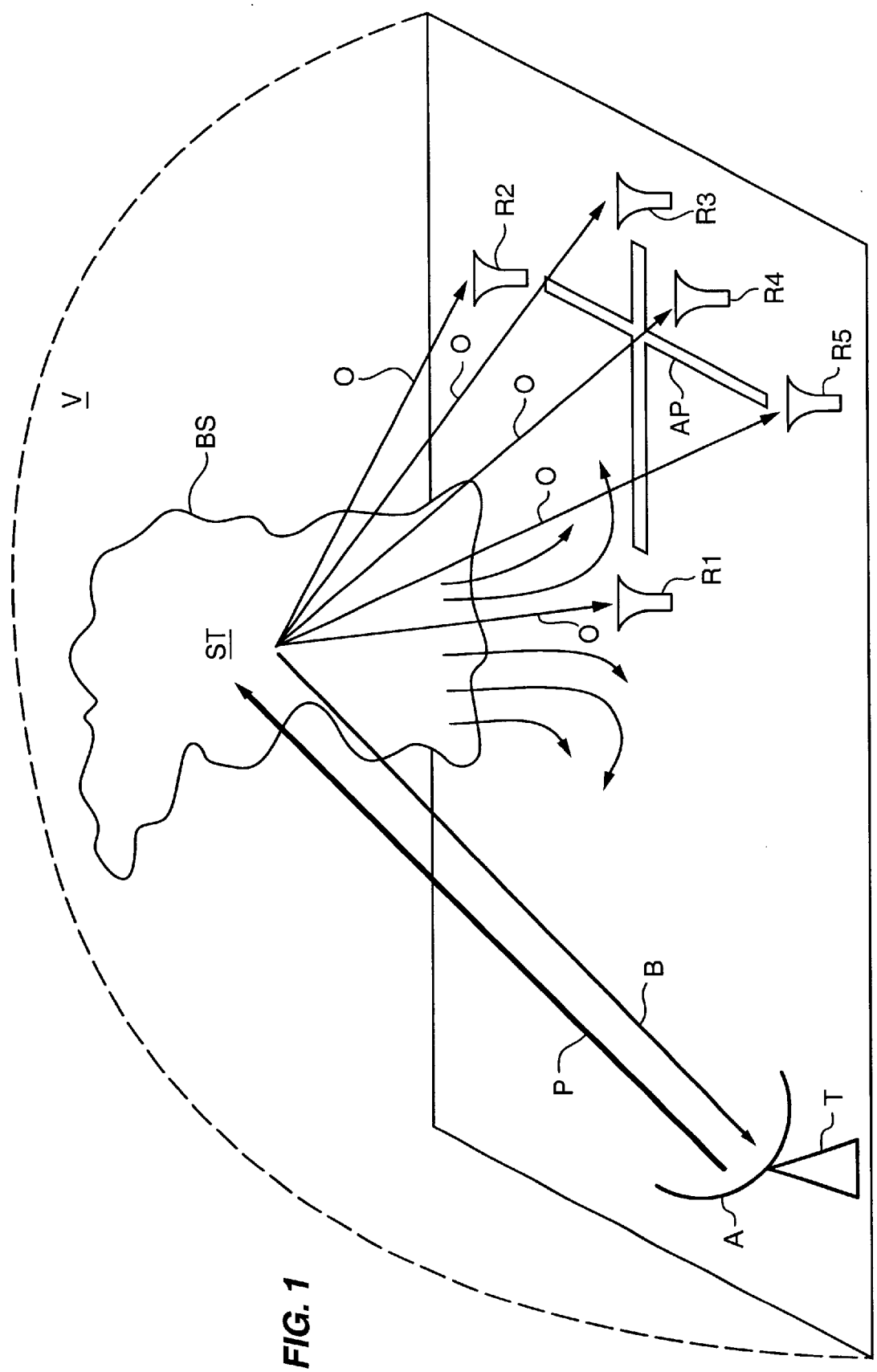
FIG. 1 Illustrates in block diagram form the overall architecture of a bistatic radar network having an incoherent transmitter.

A multiple-Doppler radar network can be constructed using only one, traditional, transmitting pencil-beam radar and one or more passive, low-gain, non-transmitting receiving sites. Radiation scattered from the pencil beam of the transmitting radar as it penetrates weather targets can be detected at the receive-only sites as well as at the active transmitter. The Doppler shifts of the radiation received at all the sites can be used to construct vector windfields in a manner similar to that used with traditional radar networks. In a bistatic network, the location of targets in Cartesian space can be calculated from location of the transmitter and receiver antennas, the time-tagged pointing angle of the transmitting antenna and the time between transmission from the active radar and detection at the passive receiver site, if the transmitter operates in a coherent mode. Surfaces of constant delay time form ellipsoids with foci at the transmitter and receiver sites. The echo time samples may be correlated to a position along the beam P if the receiving station R is synchronized with the transmitter T and has the pointing angle of the transmitter antenna A and the distance between the transmitter Antenna A and the receiver antennas. The pointing angle and the location of the transmitter T define the beam path P, O through the sky relative to the receiver antennas. If the receiver is then time synchronized with the transmission of pulses from the transmitter T and knows the distance between transmitter and receiver antennas, the receiver can then determine the location along beam path P, O where each time sample of the echo signal originated.

There are scientific advantages particular to a bistatic multiple-Doppler network: 1. Velocity component measurements from the simultaneously illuminated individual pulse volumes are collected substantially simultaneously at all the receivers since there is only one source of radiation. 2. The intensity of the obliquely scattered radiation can be compared to Rayleigh scattering predictions and used for hail detection. 3. Rapid scanning of localized weather phenomena can be aided by elimination of the need to scan with multiple scanning radars. This type of radar network also has significant economic advantages. Passive receiver sites contain no high voltage transmitting equipment or large rotating antennas, and they also require no operators and much less maintenance than rotating antennas.

There are shortcomings particular to bistatic radar networks: 1. Passive receiving sites have lower gain antennas (broader field of view) than scanning radar systems and are more sensitive to contamination from transmitter side-lobes and to secondary, or multiple scattering from weather echoes. 2. Lower gain receiving sites are less sensitive to weak weather echoes. 3. Cartesian (u, v, w) windfields derived from bistatic network data exhibit greater error components than those constructed from data from traditional monostatic networks containing equal numbers of radars when advection/evolution are not taken into account. Multiple scattering and side-lobe contamination levels are acceptable in most situations and can be reduced by the use of higher gain (narrower field of view) receiving antennas. The reduced sensitivity and increased error components of the bistatic network can be ameliorated by the use of multiple passive receiver sites, a practical solution due to their very low cost.

Network Architecture

The basic architecture of a bistatic multiple-Doppler radar network having an incoherent transmitter is illustrated in block diagram form in FIG. 1. The network includes at least one pulsed Doppler radar transmitter T and a plurality of receivers R1–R5, at least one of which is a passive, inexpensive receiver. The pulsed Doppler radar transmitter T generates a "pencil-beam" radar signal that is output, via a highly directional scanning antenna A, into a predetermined volume of space V which may be located in close proximity to or around the Doppler radar transmitter T. The scan pattern of the antenna A can either be the full volume of space around transmitter T or can be selected as a function of the topography around the Doppler radar transmitter site and the volume of interest V. The incoherent transmitter generates pulses of high frequency energy that vary in frequency and/or phase. The transmitted radar beam P, consisting of a series of radio frequency pulses, is reflected off targets (scatterers) ST located in the predetermined volume V. One component B of the reflected radar beam (back scattered) is received by the scanning antenna A of the Doppler radar transmitter T, while other components O of the reflected radar beam (obliquely scattered) are detected by the passive receivers R1–R5.

As illustrated in FIG. 1, the volume of interest V is sited above and around an airport AP so that meteorological phenomena BS in this volume V that may impact airport operations can be detected. The radar transmitter T is typically located at a site somewhat distant from the airport AP so that the scan pattern of the scanning radar antenna A is reduced from a full semi-spherical pattern to a narrow segment of a sphere. This reduced scan pattern enables the radar beam P to more frequently probe the volume V. The transmitted radar beam P that is scattered off various targets ST in the volume V must be detected by a number of receivers R1–R5 in order to obtain an accurate determination of the three-dimensional motion of the meteorological phenomena. A single monostatic receiver obtains only partial information since the back scattered beam B cannot identify any motion components that are orthogonal to the radial direction of transmission. The passive receivers R1–R5 are located at sites remote from the Doppler radar transmitter T site. There are typically a plurality of passive receivers R1–R5 associated with a Doppler radar transmitter T to provide good a real coverage and to resolve the limited information obtained from the radial radar beam P. Their siting is a function of topography of the region and the accuracy of the measurements that are desired.

Figure 2:
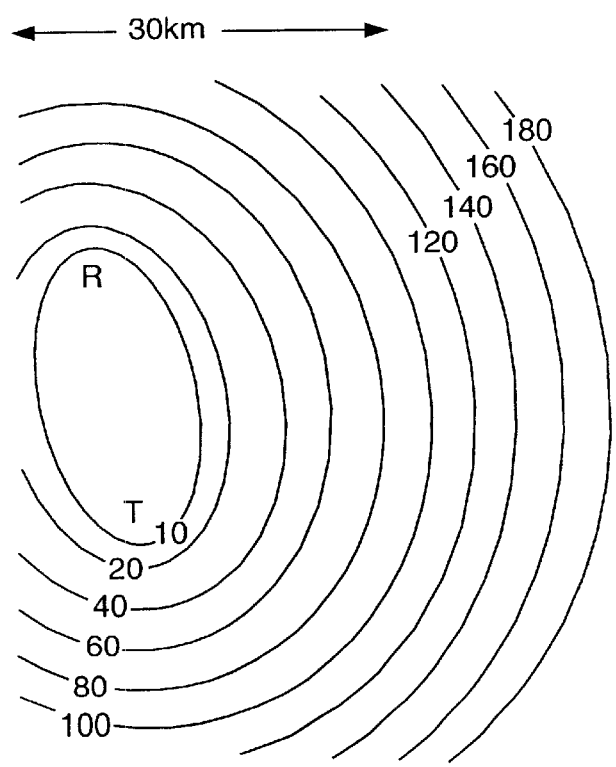
FIG. 2 illustrates a set of constant delay time surfaces that are found by the radar beam around a transmitter site and receiver site pair.
Figure 3:
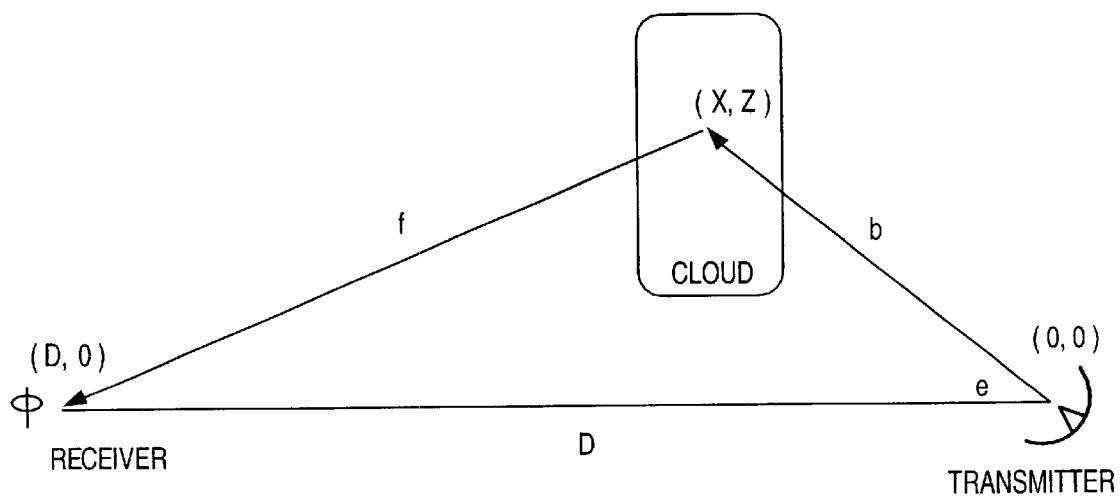
FIG. 3 illustrates the path geometry for directly transmitted and reflected radar pulses.

In a bistatic Doppler radar network, the location of a scatterer ST in Cartesian space can be calculated from the time-tagged pointing angle of the transmitting antenna A and the time between transmission of a radar pulse from the radar transmitter T and detection of the reflected radar pulse at the passive receiver site. Surfaces of constant delay time form ellipsoids with foci at the transmitter site and the receiver site, as illustrated in cross-section view in FIG. 2 for a short-baseline system. The location of a scattering particle ST in the volume V, relative to the transmitter site, is specified by:

$$x = \frac{(ct)^2 - D^2}{2[ct - D\cos(p)]} \sin(a)\cos(e)$$

$$y = \frac{(ct)^2 - D^2}{2[ct - D\cos(p)]} \cos(a)\cos(e)$$

$$z = \frac{(ct)^2 - D^2}{2[ct - D\cos(p)]} \sin(e)$$

where p is the angle enclosed by the transmitter-particle and transmitter-receiver vectors, c is the speed of light, D is the distance between the transmitter site and the receiver site, and a and e are the azimuth and elevation angles relative to the transmitting radar antenna A. This formulation is illustrated schematically in FIG. 3 for the two-dimensional case (y=0). In this simplified case the angle p is equal to the elevation angle e of the transmitter antenna A.

In bistatic radar networks, the length of effective radar resolution volumes [roughly proportional to $\partial$ (range along the transmitted beams)/$\partial$ (delay time)] are not constant. This can be seen easily by contrasting the arrival time of radiation scattered from transmitted beams P directed toward and away from the bistatic receiver along the transmitter-receiver baseline. All radiation scattered forward toward the receiver site arrives at the receiver simultaneously, regardless of the scatterers' locations along the beam P (all path lengths are identical). In contrast, radiation back scattered toward the Doppler radar transceiver T is delayed by one microsecond for each 150 meter change in scatterer placement along the baseline. In this case, the effective length of resolution volumes is the same as that for a traditional monostatic weather radar. The same result occurs if the scatterers ST are off the baseline but are extremely distant from the bistatic radar network. At most transmission angles, near the bistatic couplet, but away from its baseline, the resolution-volume length is expanded by factors ranging from 1–4.

The reflectivity-weighted particle velocity can be retrieved at any point by solving the system of equations:

$$VR_i = u \sin(a_i)\cos(e_i) + v \cos(a_i)\cos(e_i) + w_p \sin(e_i), i=1, n$$

where VRi are the radial velocities measured by the n radars, ai and ei are the azimuth and elevation angles of the n radars, and u, v, $w_p$ are the Cartesian components of the particle velocity field. In dual-Doppler analyses the vertical air-parcel velocity wa is obtained through the integration of mass continuity. If measurements are available from more than three radars, the system of equations is over-determined and can be solved by minimizing error.

Using the location of both the transmitter antenna A and receiver antenna S, the location of the target as defined by these variables can be determined when the radar echoes are received.

Accuracy

The variance and standard deviations of the estimates of (u, v, $w_p$) in the three-radar network are expressed by:

$$\frac{1}{\sigma^2}\begin{bmatrix} a_1^2 & \beta_1^2 & y_1^2 \\ a_2^2 & \beta_2^2 & y_2^2 \\ a_i^2 & \beta_1^2 & y_1^2 \end{bmatrix}\begin{bmatrix} \sigma^2 VR_1 \\ \sigma^2 VR_2 \\ \sigma^2 VR_t \end{bmatrix} = \begin{bmatrix} \sigma u^2 \\ \sigma v^2 \\ \sigma^2 w_p \end{bmatrix}$$

Typical standard deviations in bistatic radar networks are twice that of monostatic radar networks consisting of comparable numbers of radars. Since the cost of bistatic radar receiving sites is very low, less than one-thirtieth of that of conventional transmitters, it is practical to deploy many passive receivers in a typical bistatic radar network. In this fashion, accurate wind fields can be retrieved at a much lower cost than with traditional systems.

In the Rayleigh limit, the intensity of the radiation scattered obliquely from a transmitted radar beam varies with the scattering angle measured relative to the transmitted E vector such that I Io sin($\theta$), where I is the intensity of the scattered radiation, Io is the intensity of the incident radiation, and $\theta$ is the angle between the incident E vector and the propagation vector of the scattered radiation. In addition, the bistatic geometry affects the size and shape of the resolution volumes as noted above. Therefore, modified versions of the traditional radar equation must be used to calculate reflectivity. This angle-dependent scattering intensity strongly impacts the usefulness of bistatic radars and the choice of appropriate transmitter and receiver sites. If horizontally polarized radiation is transmitted, then there is a circular region at ground level from which there is very little scattering toward a particular receiver. This region is the locus of all points from which the E vector of transmitted beams points at the receiver.

The use of vertical polarization in the radar beam P moves the low-sensitivity notch from the ground level to a vertical plane over the transmitter-receiver baseline. Bistatic networks that employ circular polarization have no low-sensitivity notch. While not nearly as sensitive as a traditional monostatic weather radar, the displayed bistatic configuration, using vertically polarized transmissions, provides a minimum sensitivity of 0–10 dBZ within the useful multiple-Doppler lobes and below −5 dBZ within 4 km of the receiving site. This is adequate for most purposes, but applications that require extreme sensitivity need to use higher-gain receiving antennas, say 25 dB, shorter transmitter-receiver baselines, or multiple receiver configurations to achieve sensitivities below −15 dBZ.

Frequency and Phase Coherence

In order to accurately determine the velocity components perpendicular to the bistatic radar network's ellipsoidal delay time surfaces from the reflected radar pulses received at the remote bistatic receivers R1–R5, accurate knowledge of the phase and frequency of the transmitted radar pulses must be available. The incoherent transmitter T produces pulses whose phase can differ from pulse to pulse, while the frequency typically varies on a less significant basis.

Therefore, the present bistatic radar network having an incoherent transmitter T must transmit data to all of the receivers R1–R5 to identify both the frequency and phase of each pulse in the series of pulses, where each pulse must be uniquely identified to ensure that all of the receivers R1–R5 are measuring reflected components of the same transmitted pulse. Since the frequency of the incoherent transmitter T does not significantly vary from pulse to pulse, the transmitter frequency can be measured periodically and this data transmitted to the receivers R1–R5 on an as needed basis, or on a regular but other than pulse by pulse basis. The receivers R1–R5 can then maintain the frequency data until updated. The phase of the pulses must be updated on a pulse by pulse basis and this data is transmitted to the receivers R1–R5 for signal processing of the received reflected pulse components 0 by tagging each pulse that is transmitted by the incoherent transmitter T. Thus, each pulse that emanates from the incoherent transmitter T is coordinated with each received reflected component O at the respective receivers R–R5. This ensures that synchronization is maintained between the incoherent transmitter T and the receivers R1–R5. This coordination can be accomplished in a number of ways, with each beam (antenna pointing angle) and the series of pulses in the beam being identified to the receivers R1–R5 in a manner that enables the coordination of each transmitted pulse with each received reflected component.

Timing Coherence

For example, in order to determine the location of resolution volumes accurately, the precise time of the transmission of the radar pulses from transmitter T must be known at all of the receivers R1–R5. To achieve suitable accuracy, this timing must be known within approximately 100 ns. This is particularly true near the transmitter-receiver baselines where effective resolution volumes are expanded.

There are several approaches to meeting this timing coherence requirement, falling into two main categories. In the first category, extremely accurate time is kept at both the transmitter T and receivers R1–R5 and data indicative of the pulse transmission time from the transmitter T is sent to all the receivers R1–R5. The information arrives at each receiver R1–R5 well after the obliquely scattered radiation O, but the pulse repetition frequency can be used to correlate the received radiation O with the pulse transmission time. In the second method, the transmitted pulse is detected directly at the receivers R1–R5. This direct radiation, from the existing sidelobes or through radiation beamed intentionally at the remote receiving antennas, always arrives before any scattered radiation and can be used to start a ranging clock.

Atomic clocks can provide extreme timing accuracy but drift relative to each other. Even though accurate within 1 part in $10^{12}$, they tend to drift apart by roughly 100 ns per day and these clocks must be recalibrated frequently. Either as a method of recalibration or as an independent timing method, the arrival time of direct-path radiation from the sidelobes of the transmitter antenna A could be measured. This radiation may be difficult to detect in sheltered locations, thus complicating the accurate calculation of its arrival time.

The preferred method of achieving both timing and frequency coherence is to link the transmitter T and all the receivers R1–R5 to an external timing standard. Both Loran and Global Positioning Satellite (GPS) signals can provide the needed information, but only the GPS signals include time of day information so that the timing coherence can always be maintained without recalibration. Both signals can be used to achieve frequency coherence to well within one part in $10^{10}$ (0.3 Hz at $\lambda$=0.1 m) if disciplined oscillators with high short-term stability are used.

Bistatic Radar Network Implementation

Figure 4:
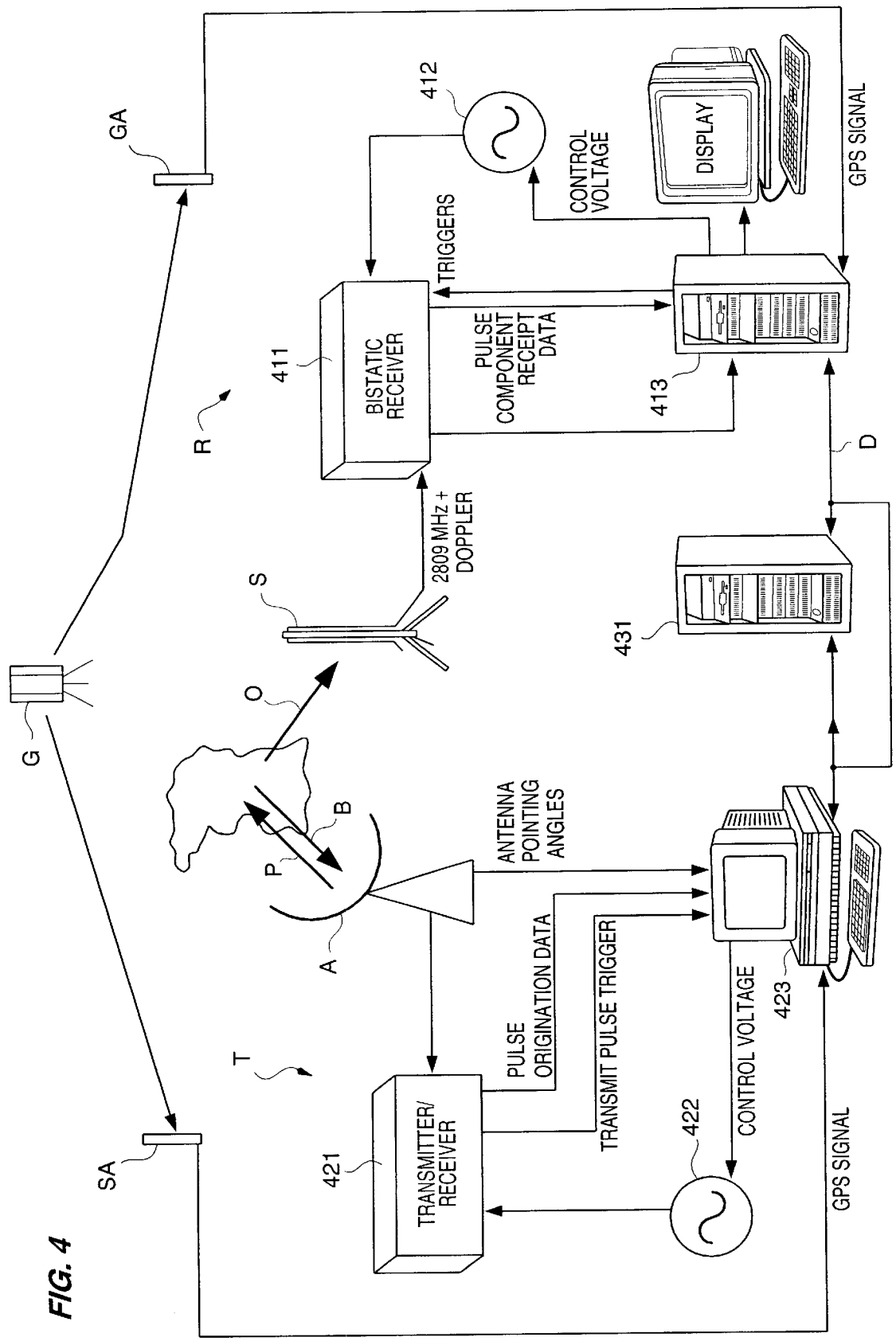
FIG. 4 illustrates in block diagram form additional details of the bistatic radar network having an incoherent transmitter.

FIG. 4 illustrates a more detailed implementation of the bistatic radar network. For simplicity of description, only one passive receiver R is illustrated. Pulsed Doppler radar transmitter T scans a predefined volume of space using a stream of incoherent radar pulses P transmitted in a radial direction from the antenna A into the volume V. The antenna A sweeps the predefined volume V with the radar beam P on a periodic basis. Once component B of the radar beam P is back scattered from a scatterer ST to antenna A along the transmit path while a second component O of the transmitted radar beam P is reflected at an oblique angle from the scatterer ST toward receiver R. Receiver R, is equipped with an antenna S that is a passive element and not steerable. Therefore, receiver R must detect the obliquely reflected component O and reject background noise as well as signals arriving from outside of the predefined volume V, and/or from regions of the predefined volume V that are not monitored by antenna S. In order to enhance the performance of receiver R, a directional antenna S is used to receive signals from only a segment of space, which segment includes all or a portion of the predefined volume V. An excellent choice for the antenna S is a slotted waveguide antenna, which exhibits high gain in a predetermined direction and significantly lower gain elsewhere. The slots are arranged to produce a desired gain pattern which falls off steeply outside of the desired field of view.

The signals received by antenna S consist of base frequency signals (for example 2809 MHZ) with the superposition Doppler offset components related to the collective movement of the distributed targets illuminated by transmitter T at a particular location in space. These received signals are coupled to bistatic receiver 411 which is synchronized to the transmitter frequency and pulse transmission time as identified by the transmitter T for accuracy of ranging and gating. A precisely controlled oscillator 412 is used as a reference frequency source for bistatic receiver 411. The output frequency of oscillator 412 is controlled by processor 413 which receives reference signals from a number of sources.

Timing antenna GA receives timing signals from a source G that is common to all receivers R1–R5 in the bistatic network. An example of such a common timing source G is the Global Positioning System (GPS), which transmit signals of precise frequency. These signals are also time stamped. The received GPS signals are used by processor 413 to discipline oscillator 412 to maintain frequency coherence with the GPS reference, which in turn allows synthesis of signals coherent with transmitter T. The received GPS signals can also be used as a time reference to obtain synchronization with the transmitted radar pulses. A control processor 423 located at the transmitter T also receives GPS timing information and, in the particular example shown, disciplines timing reference oscillator 422 in identical fashion. It also generates data indicative of the time delay between the radar pulse and the GPS timing signals which occur at 1 pulse per second. This data is transmitted to the receiver R via a data link D and used at the receiver R to obtain timing synchronization with the radar pulses. Alternatively, the transmitter T can transmit pulses directly to receiver R in conjunction with the scan beam.

In either case, the reference frequency output by oscillator 412 and timing synchronization information from processor 413 are used by bistatic receiver 411 to produce received pulse data indicative of the characteristics, such as in-phase and quadrature components, of the received radar echoes. These data and the timing data indicative of the time difference between the transmitted pulse and the received signals represent receiver data that are indicative of the locus, motion, and characteristics of the scatterers. These data are stored in processor 413 and retrieved on a periodic basis by signal processor 431, which uses these retrieved data from all the receivers and the time-tagged antenna pointing data to accurately identify the locus, motion, and characteristics of the scatterers. Alternatively, processing can be distributed and processor 413 can perform many of the computation functions described below as performed by signal processor 431.

In this particular example, timing antenna SA receives timing signals from a source that is common to all receivers R1–R5 in the bistatic network. An example of such a source is the GPS satellites G, which transmit signals of precise frequency. These signals are also time stamped. The received GPS signals are used by processor 423 to discipline oscillator 422 to maintain frequency and timing coherence with the remainder of the bistatic network. The reference frequency output by oscillator 422 and timing synchronization information from processor 423 are used by transceiver 421 to produce the frequency coordinated transmit pulse and received radar echo data indicative of the characteristics of the received signals. In addition, antenna A outputs antenna pointing angle information that defines the precise transmitted direction of transmitted radar beam P. This data is stored in processor 423 and retrieved on a periodic basis by signal processor 431. Alternatively, processing can be distributed and processor 423 can perform many of the computation functions performed by signal processor 431.

The signal processor 431 can be connected via data communication links to all the receivers R1–R5 and transmitter T that form the bistatic network. The data received from these elements represent the information that defines the path of the transmitted radar beam as well as the paths that the received reflected components traversed. The timing information associated with each of the received signals is indicative of the distance of the target from the receivers R1–R5 and transmitter T. These data are used by signal processor 431 to compute the locus and motion vectors for the detected target.

Signal Processor

Signal processor 431 receives data transmitted by all receivers R1–R5 as well as transmitter T. The processing of the data from a plurality of receivers is well-known and not described herein in detail in the interest of brevity of description. The data collection from each of the receivers R1–R5 to signal processor 431 can be done on dedicated data links or even RF link basis. These represent matters of engineering choice and are best implemented on a site-specific basis.

The signal processor 431 receives the pulse origination data fro the incoherent transmitter T and the raw data or partially processed data derived from each received reflected pulse component from each receiver R1–R5. These data are tagged on a pulse-by-pulse basis to enable the signal processor 431 to correlate the originated pulse with each received reflected pulse component. Thus, signal processor 431 can, for example, create a matrix that is populated with the time tagged data from both the incoherent transmitter T and the receivers R1–R5. Even if data points are missing from this matrix, the signal processor 431 can still process the remaining data to obtain the scatterer presence, locus, motion, and characteristic data.

Transmitter Antenna Pointing-Angle Information

Accurate, time-tagged transmitter antenna pointing-angle information is necessary to calculate the location of scatterers ST in space. A significant characteristic of the bistatic network is that the use of a common timing source G, such as GPS satellites, which obviate the need for the exchange of timing synchronization data between transmitter T and the receivers R1–R5 on a pulse-by-pulse basis. The time stamped timing information received from the GPS satellites establishes a time baseline which can be used by each receiver R1–R5 to dynamically compute the pulse origination time of each radar pulse produced by transmitter T, as long as the timing sequence remains invariant and each receiver R1–R5 has data indicative of the pulse timing offset from the baseline timing signals. Thus, transmitter T can broadcast pulse origination time offset data that indicates the origination time of a radar pulse with reference to one of the predetermined baseline timing signals. Each receiver R1–R5 can then use this received data and knowledge of the pulse repetition frequency of transmitter T to extrapolate the pulse origination time for successive pulses output by transmitter T. The baseline timing information available from a common timing source enables all the receivers R1–R5 to operate independent of the transmitter T, and yet stay in synchronization with the pulses output by transmitter T. The primary source of errors in this system would be any deviation in pulse repetition frequency due to transmitter anomalies. Furthermore, the addition or deletion of receivers from the bistatic network becomes a matter of simple expediency, since the operationally independent receivers are not intimately linked to transmitter T. Signal processor 431 can adjust the processing algorithms to account for the variation in the number of sources of data on a dynamic basis.

Summary

The bistatic network having an incoherent transmitter uses a scanning beam antenna located at the transmitter to transmit a focused beam of high frequency energy into a predefined space, with the transmitted beam comprising a series of pulses, each pulse in the series of pulses having a varying frequency, phase, pulse origination time and direction of propagation as it is emanated from said antenna. The receivers generate pulse component receipt data indicative of receipt of components of the pulses that are contained in the transmitted beam that are reflected from scatterers in the predefined space, and a processor, responsive to receipt of the pulse origination data from the transmitter and the pulse component receipt data, for generating scatterer location data indicative of presence, locus, motion, and characteristics of scatterers in the predefined space.

What is claimed:

1. A radar network for determining the presence, locus, motion, and characteristics of scatterers in a predefined space, said radar network comprising:

means for transmitting a focused beam of high frequency energy into said predefined space using an antenna, with said transmitted beam comprising a series of pulses, each pulse in said series of pulses having a frequency, phase, pulse origination time and direction of propagation as it is emanated from said antenna wherein said phase in each pulse may vary from other pulses in said series of pulses;

means for determining pulse origination data comprising: frequency, phase, pulse origination time and direction of propagation, for each of said pulses in said transmitted beam emanating from said antenna;

means for scanning said antenna;

at least one receiver, located at a site remote from said transmitting means, for generating pulse component receipt data indicative of receipt of components of said pulses that are contained in said transmitted beam that are reflected from scatterers in said predefined space; and means, responsive to receipt of said pulse origination data and said pulse component receipt data, for generating scatterer location data indicative of presence, locus, motion, and characteristics of said scatterers in said predefined space.

2. The radar network of claim 1 wherein said means for determining pulse origination data, comprises:
   means for generating data indicative of phase of each pulse contained in said transmitted beam; and
   means for generating data indicative of the frequency of each pulse contained in said transmitted beam.

3. The radar network of claim 2 wherein said means for determining pulse origination data, comprises:
   means for generating data indicative of azimuth and elevation of each pulse contained in said transmitted beam as they are emanated from said antenna.

4. The radar network of claim 1 further comprising:
   means for transmitting to each of said at least one receiver, a set of said pulse origination data for each selected pulse contained in said transmitted beam, said set of said pulse origination data comprising data indicative of phase of said selected pulse, frequency of said selected pulse, pulse origination time and direction of propagation for said selected pulse as it is emanated from said antenna.

5. The radar network of claim 4 wherein said means for generating scatterer location data comprises:
   means for storing a set of said pulse component receipt data for each pulse contained in said transmitted beam which generates components reflected from scatterers in said predefined space; and
   means, responsive to receipt of a set of said pulse origination data, for extracting from said memory, a corresponding one of said set of said pulse component receipt data for each pulse contained in said transmitted beam which generates components reflected from scatterers in said predefined space.

6. The radar network of claim 5 wherein said means for generating scatterer location data further comprises:
   means for calculating presence, locus, motion, and characteristics of said scatterers in said predefined space from a plurality of said sets of said pulse origination data and corresponding ones of said sets of said pulse component receipt data for each pulse contained in said transmitted beam which generates components reflected from scatterers in said predefined space.

7. The radar network of claim 5 wherein said means for generating scatterer location data further comprises:
   means for immediately calculating presence, locus, motion, and characteristics of said scatterers in said predefined space from a plurality of said sets of said pulse origination data and corresponding ones of said sets of said pulse component receipt data for each pulse contained in said transmitted beam which generates components reflected from scatterers in said predefined space.

8. The radar network of claim 1 wherein said means for transmitting comprises:
   means for generating a plurality of pulse signals of high frequency energy, which differ from each other by a frequency difference and a phase difference; and
   means for forming said focused beam of high frequency energy by applying said plurality of pulse signals of high frequency energy to said antenna.

9. The radar network of claim 8 wherein said means for scanning comprises:
   means for mechanically scanning said antenna through an azimuth scan pattern while controllably incrementing an elevation of said antenna.

10. The radar network of claim 8 wherein said means for scanning comprises:
    means for mechanically scanning said antenna through an elevation scan pattern while controllably incrementing an azimuth of said antenna.

11. The radar network of claim 1 wherein said antenna comprises:
    a dual polarization, slotted waveguide array antenna.

12. A method of operating a bistatic radar network for determining the presence, locus, motion, and characteristics of scatterers in a predefined space, said method comprising the steps of:
    transmitting a focused beam of high frequency energy into said predefined space using an antenna, with said transmitted beam comprising a series of pulses, each pulse in said series of pulses having a frequency, phase, pulse origination time and direction of propagation as it is emanated from said antenna wherein said phase in each pulse may vary from other pulses in said series of pulses;
    determining pulse origination data comprising: frequency, phase, pulse origination time and direction of propagation, for each of said pulses in said transmitted beam emanating from said antenna;
    scanning said antenna;
    receiving reflected components of said pulses with at least one receiver, located at a site remote from said antenna, by generating pulse component receipt data indicative of receipt of components of said pulses that are contained in said transmitted beam that are reflected from scatterers in said predefined space; and
    generating, in response to receipt of said pulse origination data and said pulse component receipt data, scatterer location data indicative of presence, locus, motion, and characteristics of said scafterers in said predefined space.

13. The method of operating a bistatic radar network of claim 12 wherein said step of determining pulse origination data, comprises:
    generating data indicative of phase of each pulse contained in said transmitted beam; and
    generating data indicative of the frequency of each pulse contained in said transmitted beam.

14. The method of operating a bistatic radar network of claim 13 wherein said step of determining pulse origination data, comprises:
    generating data indicative of azimuth and elevation of each pulse contained in said transmitted beam as they are emanated from said antenna.

15. The method of operating a bistatic radar network of claim 12 further comprising the step of:
    transmitting to each of said at least one receiver, a set of said pulse origination data for each selected pulse contained in said transmitted beam, said set of said pulse origination data comprising data indicative of phase of said selected pulse, frequency of said selected pulse, pulse origination time and direction of propagation for said selected pulse as it is emanated from said antenna.

16. The method of operating a bistatic radar network of claim 15 wherein said step of generating scatterer location data comprises:
    storing a set of said pulse component receipt data for each pulse contained in said transmitted beam which generates components reflected from scatterers in said predefined space; and
    extracting, in response to receipt of a set of said pulse origination data, from said memory, a corresponding one of said set of said pulse component receipt data for each pulse contained in said transmitted beam which generates components reflected from scatterers in said predefined space.

17. The method of operating a bistatic radar network of claim 16 wherein said step of generating scatterer location data further comprises:

calculating presence, locus, motion, and characteristics of said scatterers in said predefined space from a plurality of said sets of said pulse origination data and corresponding ones of said sets of said pulse component receipt data for each pulse contained in said transmitted beam which generates components reflected from scatterers in said predefined space.

18. The method of operating a bistatic radar network of claim 16 wherein said step of generating scatterer location data further comprises:

immediately calculating presence, locus, motion, and characteristics of said scatterers in said predefined space from a plurality of said sets of said pulse origination data and corresponding ones of said sets of said pulse component receipt data for each pulse contained in said transmitted beam which generates components reflected from scatterers in said predefined space.

19. The method of operating a bistatic radar network of claim 12 wherein said step of transmitting comprises:

generating a plurality of pulse signals of high frequency energy, which differ from each other by a frequency difference and a phase difference; and forming said focused beam of high frequency energy by applying said plurality of pulse signals of high frequency energy to said antenna.

20. The method of operating a bistatic radar network of claim 19 wherein said step of scanning comprises:

mechanically scanning said antenna through an azimuth scan pattern while controllably incrementing an elevation of said antenna.

21. The method of operating a bistatic radar network of claim 19 wherein said step of scanning comprises:

mechanically scanning said antenna through an elevation scan pattern while controllably incrementing an azimuth of said antenna.

22. A bistatic radar network for determining the presence, locus, and characteristics of scatterers in a predefined space, said radar network comprising:

transmitter means for transmitting a focused beam of high frequency energy into said predefined space using an antenna, with said transmitted beam comprising a series of pulses, each pulse in said series of pulses having a frequency, phase, pulse origination time and direction of propagation as it is emanated from said antenna wherein said phase in each pulse may vary from other pulses in said series of pulses;

pulse characterization means for determining pulse origination data comprising: frequency, phase, pulse origination time and direction of propagation, for each of said pulses in said transmitted beam emanating from said antenna;

antenna control means for scanning said antenna;

at least one bistatic receiver, located at a site remote from said transmitter means, for generating pulse component receipt data indicative of receipt of components of said pulses that are contained in said transmitted beam that are reflected from scatterers in said predefined space; and scatterer computation means, responsive to receipt of said pulse origination data and said pulse component receipt data, for generating scatterer location data indicative of presence, locus, motion, and characteristics of said scatterers in said predefined space.

23. The bistatic radar network of claim 22 wherein said pulse characterization means, comprises:

phase measurement means for generating data indicative of phase of each pulse contained in said transmitted beam; and frequency measurement means for generating data indicative of the frequency of each pulse contained in said transmitted beam.

24. The bistatic radar network of claim 23 wherein said pulse characterization means, comprises:

antenna pointing measurement means for generating data indicative of azimuth and elevation of each pulse contained in said transmitted beam as they are emanated from said antenna.

25. The bistatic radar network of claim 22 further comprising:

communication link means for transmitting to each of said at least one receiver, a set of said pulse origination data for each selected pulse contained in said transmitted beam, said set of said pulse origination data comprising data indicative of phase of said selected pulse, frequency of said selected pulse, pulse origination time and direction of propagation for said selected pulse as it is emanated from said antenna.

26. The bistatic radar network of claim 25 wherein said scatterer computation means comprises:

memory means for storing a set of said pulse component receipt data for each pulse contained in said transmitted beam which generates components reflected from scatterers in said predefined space; and data retrieval means, responsive to receipt of a set of said pulse origination data, for extracting from said memory means, a corresponding one of said set of said pulse component receipt data for each pulse contained in said transmitted beam which generates components reflected from scatterers in said predefined space.

27. The bistatic radar network of claim 26 wherein said scatterer computation means further comprises:

real time processor means for calculating presence, locus, motion, and characteristics of said scatterers in said predefined space from a plurality of said sets of said pulse origination data and corresponding ones of said sets of said pulse component receipt data for each pulse contained in said transmitted beam which generates components reflected from scatterers in said predefined space.

28. The bistatic radar network of claim 26 wherein said scatterer computation means further comprises:

real time processor means for immediately calculating presence, locus, motion, and characteristics of said scatterers in said predefined space from a plurality of said sets of said pulse origination data and corresponding ones of said sets of said pulse component receipt data for each pulse contained in said transmitted beam which generates components reflected from scatterers in said predefined space.

29. The bistatic radar network of claim 22 wherein said transmitter means comprises:

radio frequency generator means for generating a plurality of pulse signals of high frequency energy, which differ from each other by a frequency difference and a phase difference; and antenna coupling means for forming said focused beam of high frequency energy by applying said plurality of pulse signals of high frequency energy to said antenna.

30. The bistatic radar network of claim 29 wherein said antenna control means comprises:

antenna servo means for mechanically scanning said antenna through an azimuth scan pattern while controllably incrementing an elevation of said antenna.

31. The bistatic radar network of claim 29 wherein said antenna control means comprises:

antenna servo means for mechanically scanning said antenna through an elevation scan pattern while controllably incrementing an azimuth of said antenna.

32. The bistatic radar network of claim 22 wherein said antenna comprises:

a dual polarization, slotted waveguide array antenna.

* * * * *